United States Patent [19]

Humphreys

[11] 4,434,201
[45] Feb. 28, 1984

[54] POROUS PANEL

[75] Inventor: Bryan E. Humphreys, Carlisle, England

[73] Assignee: T.K.S. (Aircraft De-Icing) Limited, Haltwhistle, England

[21] Appl. No.: 505,762

[22] Filed: Jun. 20, 1983

Related U.S. Application Data

[63] Continuation of Ser. No. 438,697, Nov. 2, 1982, abandoned.

[30] Foreign Application Priority Data

Nov. 13, 1981 [GB] United Kingdom ................. 8134230

[51] Int. Cl.³ .......................... B32B 3/10; B32B 3/02; B32B 7/12; B64D 15/08
[52] U.S. Cl. ..................................... 428/137; 428/138; 428/188; 428/194; 428/315.5; 428/316.6; 244/134 C
[58] Field of Search .................... 244/134 C; 428/137, 428/138, 188, 194, 315.5, 315.7, 316.6

[56] References Cited

U.S. PATENT DOCUMENTS

| | | | |
|---|---|---|---|
| 3,130,505 | 4/1964 | Markevitch | 428/316.6 |
| 3,423,052 | 1/1969 | Lear | 244/134 C |
| 3,614,038 | 10/1971 | Nichols | 244/134 C |
| 3,881,489 | 5/1975 | Hartwell | 428/316.6 |
| 4,259,383 | 3/1981 | Eggensperger et al. | 428/194 |
| 4,304,824 | 12/1981 | Karpinski | 428/194 |

FOREIGN PATENT DOCUMENTS

| | | | |
|---|---|---|---|
| 724019 | 2/1955 | United Kingdom | 244/134 C |
| 1094372 | 12/1967 | United Kingdom | 244/134 C |
| 1102958 | 2/1968 | United Kingdom | 244/134 C |

Primary Examiner—William J. Van Balen
Attorney, Agent, or Firm—McAulay, Fields, Fisher, Goldstein & Nissen

[57] ABSTRACT

This invention relates to a porous panel for use principally, but not exclusively, for the distribution of a freezing point depressant liquid on an aircraft surface in order to provide protection against atmospheric icing. The panel comprises an outer porous sheet over the surface of which the fluid is to be distributed, a backing sheet of microporous material in contact with one side of the outer sheet, and a sheet of fluid impervious material which is spaced from the microporous sheet. The sheets may be secured to one another by adhesive bonding over a region located outwardly of the space. The outer sheet may be a porous material, a reinforced porous plastic material or a drilled sheet material.

22 Claims, 10 Drawing Figures

POROUS PANEL

This is a continuation of application Ser. No. 438,697 filed Nov. 2, 1982, abandoned.

FIELD OF THE INVENTION

This invention relates to a porous panel for use principally, but not exclusively, for the distribution of a freezing point depressant liquid on an aircraft surface in order to provide protection against atmospheric icing.

BACKGROUND OF THE INVENTION

U.K. Pat. No. 724,019 describes a porous panel assembled by mechanical fasteners. A panel of the type described in that patent is shown diagrammatically in FIG. 1 of the accompanying drawings. As will be seen from that Figure, the panel comprises an outer skin 1 of porous metal, a sheet 2 of microporous plastic, edge spacers 3, and a non-porous backing sheet 4 assembled to the outer skin 1 by mechanical fastners 5. A cavity 7 is defined between sheets 2 and 4, and a connection 6 is provided to admit liquid into the cavity 7. Modified forms of this panel are described in U.K. Pat. Nos. 1,094,372 and 1,102,958.

SUMMARY OF THE INVENTION

An object of the present invention is to provide an improved porous panel.

According to a first aspect of the invention there is provided a porous panel for the distribution of fluid, comprising an outer sheet of porous material over the surface of which the fluid is to be distributed, a backing sheet of microporous material in contact with one side of the outer sheet, and a sheet of fluid impervious material which is spaced from the microporous sheet so that fluid can be introduced into the space between the microporous sheet and the impervious sheet whence it can pass through the porous sheets to the outer surface of the outer sheet, the sheets being secured to one another by adhesive bonding over a region located outwardly of the said space.

According to a second aspect of the invention there is provided a porous panel for the distribution of fluid, comprising an outer sheet of porous material over the surface of which the fluid is to be distributed, the outer sheet comprising a porous, reinforced plastic composite material, a backing sheet in contact with one side of the outer sheet, the backing sheet comprising a porous plastic material having a lower porosity than the outer sheet, and a sheet of fluid impervious material spaced from the backing sheet so that fluid can be introduced into the space between the backing sheet and the impervious sheet whence it can pass through the porous sheets to the outer surface of the outer sheet.

According to a third aspect of the present invention there is provided a porous panel for distribution of a fluid, comprising an outer, front sheet having holes drilled therein, a back sheet which is impervious and is secured at a peripheral region to the front sheet and defines a cavity therewith, whereby fluid can be introduced into the cavity whence it can pass through the front sheet to the outer surface thereof.

Preferably the outer sheet is formed of a metal, for example titanium, a ceramic material, a cermet or a plastic.

DETAILED DESCRIPTION OF PREFERRED EMBODIMENTS

In each of FIGS. 2a to 2d, the porous panel comprises an outer skin 1, a backing sheet 2 of microporous material contacting the outer skin 1, and an impervious sheet 4 spaced apart from the backing sheet 2.

Figure 1:
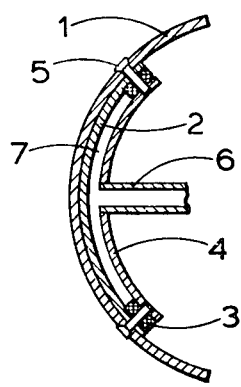
FIG. 1 is a sectional view of a known porous panel.
Figure 2A:
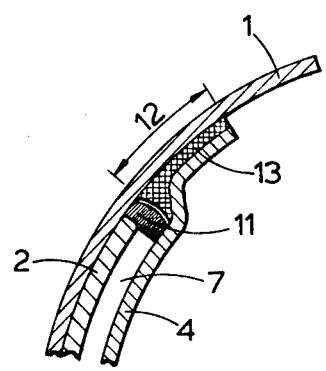
FIGS. 2a to 2d are sectional view of porous panels according to the first aspect of the invention.
Figure 2B:
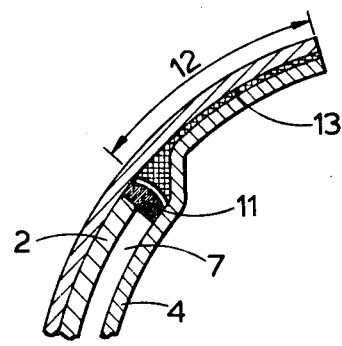
Figure 2C:
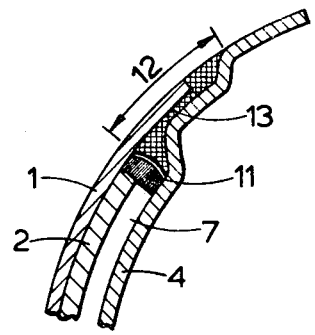
Figure 2D:
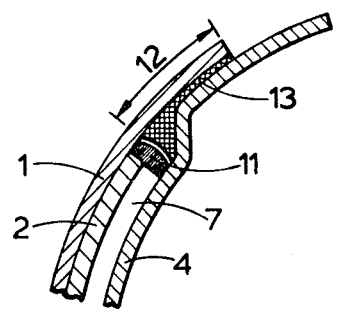

The porous outer skin 1 is attached by adhesive bonding over region 12 to the sheet 4. This is achieved by adhesive 13. The microporous sheet 2 is sealed to the sheet 4 by a flexible adhesive or sealant 11. It should be mentioned that internal pressure during operation subjects the joints between the members forming the panel to peel stresses tending to pull the members apart. It will be seen that the adhesive 13 has a wedge-shaped region; an elastic deformation of the wedge of adhesive increases the resistance of the assembly to peel stresses. In FIGS. 2a, b and d the backing sheet 4 is substantially S-shaped at a peripheral region to accommodate the wedge-shaped region of the adhesive 13. The sheets 1 and 4 have varying lengths in their peripheral bonded regions. In FIG. 2c the sheet 4 has two shoulders and the first shoulder accommodates the wedge-shaped adhesive region 13 while the second, outer shoulder accommodates the edge of the sheet 1.

In use, a liquid, for example a freezing point depressant, is introduced into the space 7 between the microporous sheet 2 and the impervious backing sheet 4. From this space 7 the liquid can pass through the porous sheets to the outer surface of the outer skin 1.

If desired, mechanical fasteners may be inserted as crack stoppers through the region 12, the fasteners being located at intervals of from, for example, 50 to 300 mm. A panel having crack stoppers is still smoother than a known panel assembled by rivets since the spacing of the stoppers can be much less than that of the rivets.

This aspect of the invention has a number of advantages. Firstly, it makes it possible to assemble porous panels more cheaply than by the previous method of using rivets. Secondly, the elimination of rivets gives a smoother external finish and therefore an improved air flow characteristic to the panel. Thirdly, for a given overall width of panel, the width which is porous to increased compared to known constructions.

Figure 3:
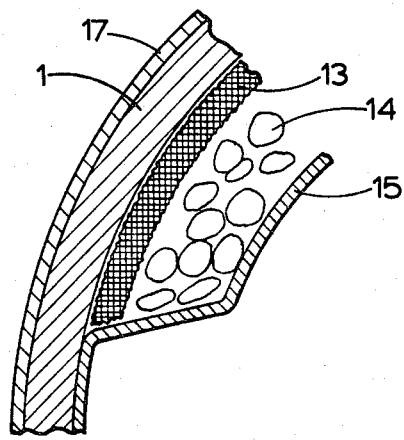
FIG. 3 is a sectional view of a porous panel according to the second aspect of the invention.
Figure 4:
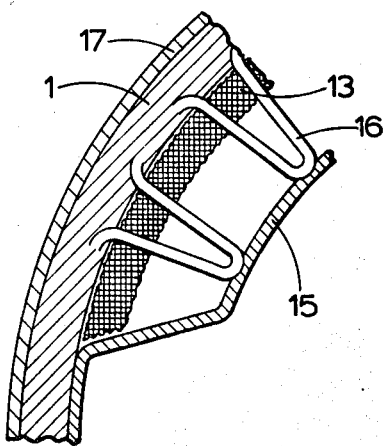
FIG. 4 is a sectional view of another embodiment of the second aspect of the invention.
Figure 4A:
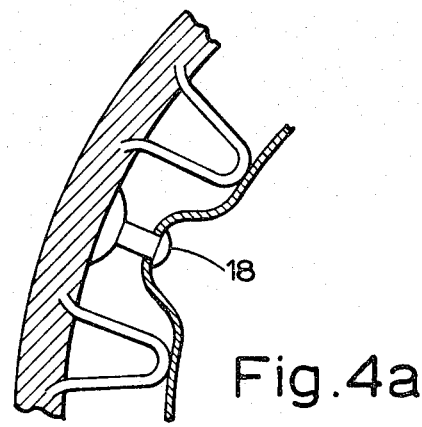
FIG. 4a is a schematic sectional view showing a variation to the embodiment of FIG. 4.

The porous panels illustrated in FIGS. 3, 4 and 4a comprise an outer sheet 1 of a reinforced plastic composite material, a porous plastic backing sheet 13 in contact with the outer sheet 12 and a spaced apart impervious sheet 15.

The embodiment of FIG. 3 comprises an outer sheet 1 consisting of porous reinforced plastic composite material having a pore size of the order of 20 to 100 microns. This material may be produced either by impregnating reinforcing fibres (e.g. glass fibres or carbon fibres) with resin treated to produce an open cell foam, by incorporation, and controlled expansion during the curing phase, of gas or liquid bubbles or solid particles, or alternatively by controlling the quantity of resin applied so that sufficient resin is available to bond the fibres together without completely filling the spaces between them.

The backing layer 13 is of similar material, but with a fibre content which is either zero or at least less than the fibre content of the outer layer 1. This permits closer control of the porosity. The layer 13 has a pore size of the order of 5 microns and a relatively low porosity. This enables fluid pressure to be developed behind the layer 13 so as to obtain an even distribution of liquid during operation. The layer of impervious material 15 is spaced from the layer 13 to define a cavity therebetween, and this cavity is substantially filled with a material 14 having a coarse structure which permits free passage of liquid but provides a support for the layer 15. The layer 14 may, for example, be an open weave cloth, or a mat of coarse chopped strands with a resin content sufficient to bond the strands at their contact point but without filling the holes therebetween.

The outer surface of the outer layer 1 is preferably and advantageously covered with a thin sheet of porous or perforated metal 17 which is bonded thereto and protects the porous panel from erosion by rain, sand and other materials. The sheet 17 also provides protection against lightning strikes.

The embodiment shown in FIG. 4 is identical to that shown in FIG. 3 except the layer 14 is replaced by loops 16 which are woven into the fibre reinforcement of the outer layer 1. The loops 16 permit the use of a much lighter backing sheet 15 since this could then be supported at close intervals over the surface of the panel.

As shown schematically in FIG. 3a, mechanical fasteners 18, i.e. rivets, can be used to attach the sheet 15 to the outer sheet 1 to prevent the panel from opening up due to the internal pressure. A spacing of from 20 to 30 mm, for example, might be appropriate for the rivets 18.

The sheet making up the porous panel can be assembled together using rivets through the sheets at the peripheral regions of the space between the sheets. Alternatively, the sheets can be bonded together using an adhesive at the edges of the space, which adhesive may be flexible.

Figure 5:
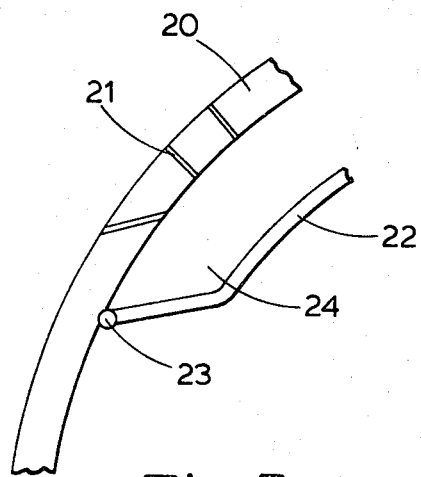
FIG. 5 is a sectional view of one embodiment of the third aspect of the invention.

As shown in FIG. 5, the front sheet 20 of the porous panel has holes 21 formed therein. As can be seen, some of these holes are perpendicular to the plane of the sheet and others are positioned obliquely. This makes it possible to vary the porosity of the sheet over its surface so as to obtain predetermined variations in flow. The holes 21 can be formed by laser or electron beam drilling. The backing sheet 22, which may, for example, be of metal, is secured directly to the front sheet 20 at region 23, for example by welding. A cavity 24 is defined between the sheets 20 and 22.

The invention permits the use of materials for the front sheet which could not be used if one was relying on a porous metal as the front sheet. For example, one can use titanium for the sheet 20, and one can also make the front sheet from a ceramic or a ceramet (a material formed from a mixture of ceramic and metal powder). Further, the front sheet could be made from plastic. For example, the front sheet could be a solid plastic sheet of nylon, polypropylene, polyethylethylketone or a similar material. These plastic materials may or may not be loaded with fillers.

Figure 6:
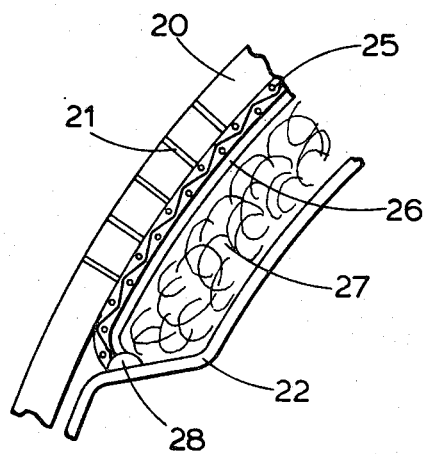
FIG. 6 is a sectional view of another porous panel according to the third aspect of the invention.

In advantageous embodiment of the invention, illustrated in FIG. 6, a microporous plastic sheet 26 is provided behind the drilled sheet 20. This sheet 26 allows a better control of the flow of fluid to the surface of the front sheet. Further, a mesh layer 25 is preferably included between the sheets 20 and 26 to protect the sheet 26 from the problems of rain erosion. The layer 25 may be a layer of closely woven, large diameter filament material such as nylon or polypropylene. This material is porous, but due to the large diameter of the fibres has sufficient strength to resist rain erosion.

Preferably, as shown in FIG. 6, an open cell foam 27 having a very large pore size is also introduced behind the porous plastic sheet 26 to resiliently hold the sheet 26 and the layer 25 in intimate contact with the rear surface of the outer drilled sheet 20.

The panel of FIG. 3 is preferably bonded together, but might possibly be assembled using mechanical fasteners or laser or electron beam welding wherein the heat is controlled within very close limits.

The layer 25 and sheets 26 and 22 are bonded together at 28.

The advantages of this third aspect of the invention over the known porous stainless steel panels are that a weight saving is achieved and the panel can have a smoother external finish. The weight saving when titanium is used would be of the order of 50% and with plastics would be in the order of 70 to 80%.

The smoother external finish is particularly important when the panel is used on aerofoils in having laminar flow characteristics. In this respect the panel, in addition to its use as a de-icer, can also be used to dispense liquid at warmer temperatures to prevent the adhesion of insects which would otherwise disturb the laminar flow characteristics of the wing.

I claim:

1. A porous panel for the distribution of fluid, comprising an outer sheet of porous material over the surface of which the fluid is to be distributed, a backing sheet of microporous material in contact with one side of the outer sheet, and a sheet of fluid impervious material which is spaced from the microporous sheet so that fluid can be introduced into the space between the microporous sheet and the impervious sheet whence it can pass through the porous sheets to the outer surface of the outer sheet, the sheets being secured to one another by adhesive bonding over a region located outwardly of the said space.

2. A panel according to claim 1, wherein the microporous sheet is sealed to the impervious sheet by a flexible adhesive or sealant, and the outer sheet and the impervious sheet are attached by an adhesive outwardly of the said flexible adhesive or sealant.

3. A panel according to claim 2, wherein the impervious sheet has a shoulder which accommodates a wedge-shaped region of the said adhesive.

4. A panel according to claim 1, further comprising mechanical fasteners, inserted through the region where the outer and impervious sheets are bonded together, as crack stoppers.

5. A porous panel for the distribution of fluid, comprising an outer sheet of porous material over the surface of which the fluid is to be distributed, the outer sheet comprising a porous, reinforced plastic composite material, a backing sheet in contact with one side of the outer sheet, the backing sheet comprising a porous plastic material having a lower porosity than the outer sheet, and a sheet of fluid impervious material spaced from the backing sheet so that fluid can be introduced into the space between the backing sheet and the impervious sheet whence it can pass through the porous sheets to the outer surface of the outer sheet.

6. A panel according to claim 5, wherein the outer sheet comprises reinforcing fibres impregnated with a treated resin.

7. A panel according to claim 5, wherein the said space is substantially filled with a material having a coarse structure which permits free passage of fluid but provides a support for the impervious sheet.

8. A panel according to claim 5, wherein loops woven into the outer sheet extend into the said space and support the impervious sheet.

9. A panel according to claim 8, wherein the panel is prevented from opening up due to internal pressure by mechanical fasteners connecting the outer and impervious sheets.

10. A panel according to claim 5, wherein a sheet of porous or perforated metal is bonded to the outer surface of the outer sheet as a protective covering.

11. A panel according to claim 5, wherein the porous sheets and the impervious sheet are assembled by adhesive bonding.

12. A porous panel for distribution of a fluid, comprising an outer, front sheet having holes drilled therein, a back sheet which is impervious and is secured at a peripheral region to the front sheet and defines a cavity therewith, whereby fluid can be introduced into the cavity whence it can pass through the front sheet to the outer surface thereof.

13. A panel according to claim 12, wherein the holes extend perpendicularly and/or obliquely to the plane of the front sheet.

14. A panel according to claim 12, wherein a microporous plastic sheet is provided behind the front sheet.

15. A panel according to claim 14, wherein a layer of a mesh of filament material is provided between the microporous plastic sheet and the front sheet.

16. A panel according to claim 15, wherein an open cell foam is provided in the cavity.

17. A panel according to claim 12, wherein the front sheet is formed of metal.

18. A panel according to claim 17, wherein the metal is titanium.

19. A panel according to claim 17, wherein the panel is assembled by welding.

20. A panel according to claim 15, wherein the panel is assembled by bonding.

21. A panel according to claim 12, wherein the front sheet is formed of a ceramic material or a ceramet.

22. A panel according to claim 12, wherein the front sheet is formed of a plastic.

* * * * *